United States Patent [19]
Millward et al.

[11] Patent Number: 5,686,939
[45] Date of Patent: Nov. 11, 1997

[54] SPATIAL LIGHT MODULATORS

[75] Inventors: John David Millward; John Gillespie, both of Hertfordshire, England

[73] Assignee: Rank Brimar Limited, England

[21] Appl. No.: 50,293

[22] PCT Filed: Nov. 18, 1991

[86] PCT No.: PCT/GB91/02032

§ 371 Date: Aug. 4, 1993

§ 102(e) Date: Aug. 4, 1993

[87] PCT Pub. No.: WO92/09064

PCT Pub. Date: May 29, 1992

[30] Foreign Application Priority Data

Nov. 16, 1990 [GB] United Kingdom ............... 9024978

[51] Int. Cl.$^6$ .................................................. G09G 5/10
[52] U.S. Cl. ..................... 345/148; 345/55; 345/147; 345/108; 345/84
[58] Field of Search ..................... 345/108, 55, 147; 345/148, 84; 359/226

[56] References Cited

U.S. PATENT DOCUMENTS

| | | | |
|---|---|---|---|
| 4,566,935 | 1/1986 | Hornbeck | 359/226 |
| 4,615,595 | 10/1986 | Hornbeck . | |
| 4,680,579 | 7/1987 | Ott . | |
| 5,280,277 | 1/1994 | Hornbele | 345/108 |

FOREIGN PATENT DOCUMENTS

| | | |
|---|---|---|
| 0261901 | 3/1988 | European Pat. Off. . |
| 0391529 | 10/1990 | European Pat. Off. . |
| 2014822 | 8/1979 | United Kingdom . |
| 9003023 | 3/1990 | WIPO . |

OTHER PUBLICATIONS

Chau, Wk, Wong, Sem, Wang J. "A Critical Analysis of Dithering Aloorithms for Image Processing". IEEE Region X Conference on Computen & Com Systems pp. 309–313, 1990 Sep..

Anastassiou, D. "Error Diffusion Coding for A/D Conversion". IEEE Trans Circuits & System 36(9):1175–1186 Sep. 1989.

Hornbeck, L.J., "Deformable–Mirror Spatial Light Modulators" Proc. SPIE Critical Review Series, vol. 1150, 6–11 Aug. 1989, San Diego, California, U.S.A. pp. 86–102.

Boysel, R.M., "A 128 + 128 frame–addressed deformable mirror spatial light modulator" Optical Engineering, vol. 30, No. 9, Sep. 1991, pp. 1422–1427.

Hornbeck, L.J., et al., "Deformable Mirror Projection Display", SID 80 Digest, pp. 228–229 (Abstract of presentation delivered Jul. 20, 1980 at SID Symposium), and United States Patent US–A–4,680,579.

Huignard, J.P., "Spatial Light Modulators and their Applications", I. Optics (Paris), 1987, vol. 18, No. 4, pp. 181–186.

Thomas, R.N. et al. "The Mirror–Matrix Tube: A Novel Light Valve for Projection Displays", IEEE Transactions on Electron Devices, vol. ED–22, No. 9 Sep. 1975, pp. 765–775.

*Primary Examiner*—Richard Hjerpe
*Assistant Examiner*—K. Chang
*Attorney, Agent, or Firm*—Lerner, David, Littenberg, Krumholz & Mentlik

[57] ABSTRACT

A spatial light modulator in the form of a deformable mirror device receives from a frame store data which has been formatted by a data formatter subsequent to gamma correction in a ROM look-up table. The DMD displays different light levels by being ON for selected periods of a series of durations 4, 8, 16, - - -, 1024 varying in proportion to a basic period multiplied by powers of two. The shortest duration 4 for which the DMD can be turned on is a multiple of the basic period, and the series includes additional durations 5, 6, and 7 in the series between the shortest displayable duration 4 and the next power of two 8. Durations 1, 2, and 3 of less than the shortest displayable duration can be displayed by adjusting the turn-on time of a proportion of the adjacent mirrors. The longest duration for which the mirror can be turned on can be employed twice.

3 Claims, 9 Drawing Sheets

SPATIAL LIGHT MODULATORS

BACKGROUND OF THE INVENTION

This invention relates to spatial light modulators, and more particularly to circuits for driving such modulators. The invention is particularly though not exclusively suitable for use with the type of spatial light modulator which has become known as a deformable mirror device or DMD.

For a background description of several types of spatial light modulator reference may be made to HUIGNARD, J. P., "Spatial Light Modulators and their Applications", J. Optics (Paris), 1987, Vol. 18, No. 4, pp 181–186. By way of example another type of spatial light modulator is described in THOMAS, R. N. et. al. "The Mirror-Matrix Tube: A Novel Light Valve for Projection Displays", IEEE Transactions on Electron Devices, Vol. ED-22, No. 9, September 1975, pp 765–775.

The deformable mirror device is a particular type of spatial light modulator and comprises a micro-mechanical array of electronically addressable mirror elements, the elements corresponding to pixels. Each pixel mirror element is capable of mechanical movement in response to an electical input. Such movement is in practice more often a deflection rather than a deformation but the term deformable mirror device has now become accepted as the description of this class of devices. They may be digitally addressed in which case they can be referred to as digital mirror devices. The expression DMD covers all of these.

For a description of current DMD technology reference is made to HORNBECK, L. J., "Deformable-Mirror Spatial Light Modulators" Proc. SPIE Critical Reviews Series, Vol. 1150, 6–11 August 1989, San Diego, Calif., U.S.A., pp 86–102. This paper contains many references to earlier work and attention is drawn particularly to references 3, 9, 14 and 23 of that paper. Further details of the construction of the devices is found in BOYSEL, R. M., "A 128×128 frame-addressed deformable mirror spatial light modulator" Optical Engineering, Vol. 30, No. 9, September 1991, pages 1422–1427. Attention is also drawn to reference 1 in that paper which is an earlier publication by Boysel et al. It has been proposed that DMDs should be usable as projection displays, see e.g. HORNBECK, L. J., et al., "Deformable Mirror Projection Display", SID 80 Digest, pp 228–229 (Abstract of presentation delivered Jul. 20, 1980 at SID Symposium), and U.S. Pat. No. 4,680,579.

The construction and manufacture of DMDs is further described in U.S. Pat. No. 4,615,595 and U.S. Pat. No. 4,566,935 and European Patent Application EP-A-0 391 529, all of Texas Instruments Incorporated.

The following description assumes a knowledge of the above-noted prior documents, all of which are hereby incorporated by reference.

A DMD may comprise an area array of deflectable mirrors, used to modulate the light in an optical projector. There is one mirror for each picture point or pixel and each mirror is approximately 20 microns square. It is termed digital because each mirror has two positions, an "on" and an "off" position. In the "on" position, incoming light is directed through the projection lens to the display screen, and in the "off" position, light is deflected away from the projection lens, so that no light reaches the screen.

The "on" and "off" positions of each mirror are controlled by two deflection electrodes, which exert an electrostatic attraction on the mirror according to which of the electrodes has been charged with the necessary bias. In addition, there is a common bias applied to all the mirrors, to hold them in their "on" or "off" positions after the potential on the deflection electrodes has leaked away. Therefore the sequence for applying new positional information to each mirror is as follows. Just before the change, the potential on each deflection electrode could be equal, especially if some time has elapsed since the previous change, but the mirrors will remain locked in their previous position because of the common mirror bias. New potentials are now applied to all the deflection electrodes over a relatively short period of approximately 60 to 80 microseconds, but during this time the mirrors stay locked in their previous positions because of the common mirror bias. After all the deflection electrodes have been recharged, the common mirror bias is removed for approximately 10 microseconds and the mirrors are now attracted by the bias present on the deflection electrodes and will change position if this bias is different from the previous setting. The common mirror bias then returns which locks the mirrors in the new position until the next time the common mirror bias is removed.

The magnitude of the light from each pixel is controlled by varying the "on/off" mark space ratio, in other words, the proportion of time in a "frame" period for which each mirror is "on". If a picture is to be displayed at 50 "frames" per second, each "frame" period will be 20 milliseconds, and the maximum amount of light would be obtained if a mirror was "on" for 20 milliseconds each frame period. To reduce the number of times the mirrors are reset during a frame period to a sensible number, the "on/off" times follow a binary pattern, a frame period being divided into binary fractions of $\frac{1}{2}$, $\frac{1}{4}$, $\frac{1}{8}$, $\frac{1}{16}$, $\frac{1}{32}$, $\frac{1}{64}$, etc. The use of such a binary series in a display device is known from United Kingdom Patent Applications Nos. GB-A-2014822A and 2164776A.

If there are 10 binary fractions (10 bits), it would be possible to obtain 1023 levels of brightness from black to maximum brightness, by the suitable selection and addition of the 10 binary fractions, and new information would be injected on 10 occasions during each frame period. 10 bits or 1023 grey scale levels is probably the minimum requirement and even this resolution is a problem since to obtain the first level, it is required that a mirror is switched "on" for the fraction $\frac{1}{1024}$ of a frame period of 20 milliseconds, which is approximately 19.5 microseconds. The first problem is that it takes approximately 10 microseconds to switch the mirrors, which is comparable with the "on" time, and the second problem is transferring data into the array during this 19.5 microseconds for the next bit in the sequence.

The input picture data sequence is standardised to suit the raster scan of a cathode ray tube, the 10 bits for the first pixel in the top left hand corner arriving first and so on. The DMD mirror array on the other hand requires that all the lower significant bits in the frame are loaded at a different time to the most significant bits, and thus there is a store to re-arrange the data.

The data output rate from the store is constant, but the data into the array is loaded in 10 variable periods and in one case mentioned earlier, one bit of the frame data must be loaded in 19.5 microseconds or the fraction $\frac{1}{1024}$ of a frame period. The data rate during this time is much greater than that leaving the store and this is accommodated by "first in/first out" (FIFO) memories. Data is clocked in at a constant rate from the store, and is clocked out in bursts to satisfy the requirements of the mirror array. The FIFO's need to store over half a frame of picture data and the number of transistors required in the FIFO integrated circuit is so large that it cannot be integrated with the mirror array and therefore the FIFO's are fabricated separately and added to the mirror substrate later. There is a limit to the number of connections between the FIFO's and the mirror array, and a mirror array operating on the 625 line standard would require 576 lines each with 1024 pixels assuming the pixels are square and the picture has an aspect ratio of 16:9. Therefore there is a requirement for 1024 connections between the FIFO's and the mirror array which is too many in practice. This is reduced to 256 by a demultiplexer and as a result, each of the FIFO's 256 outputs must produce four times 576 bits in 19.5 microseconds, to load the required data during the least significant bit display period. This gives a clock out frequency of 120 MHz, which again is not practical in the near future.

If the minimum time to transfer data to the array was 78 microseconds, the clock out frequency would be 30 MHz, which would be quite acceptable, but this is equivalent to only 8 bits of grey scale resolution.

SUMMARY OF THE INVENTION

The invention in its various aspects is defined in the appended claims to which reference should now be made.

A preferred embodiment of the invention will be described in more detail below. In this embodiment a spatial light modulator in the form of a deformable mirror device receives from a frame store data which has been formatted by a data formatter subsequent to gamma correction in a ROM look-up table. The DMD displays different light levels by being ON for selected periods of a series of durations 4, 8, 16 . . . 1024 varying in proportion to a basic period multiplied by powers of two. The shortest duration 4 for which the DMD can be turned on is a multiple of the basic period, and the series includes additional durations 5, 6 and 7 in the series between the shortest displayable duration 4 and the next power of two 8. Durations 1, 2 and 3 of less than the shortest displayable duration can be displayed by adjusting the turn-on time of a proportion of the adjacent mirrors. The longest duration for which the mirror can be turned on can be employed twice.

BRIEF DESCRIPTION OF THE DRAWINGS

The invention in its various aspects will be described by way of example with reference to the drawings, in which.

DETAILED DESCRIPTION OF THE PREFERRED EMBODIMENTS

First Embodiment

Figure 1:
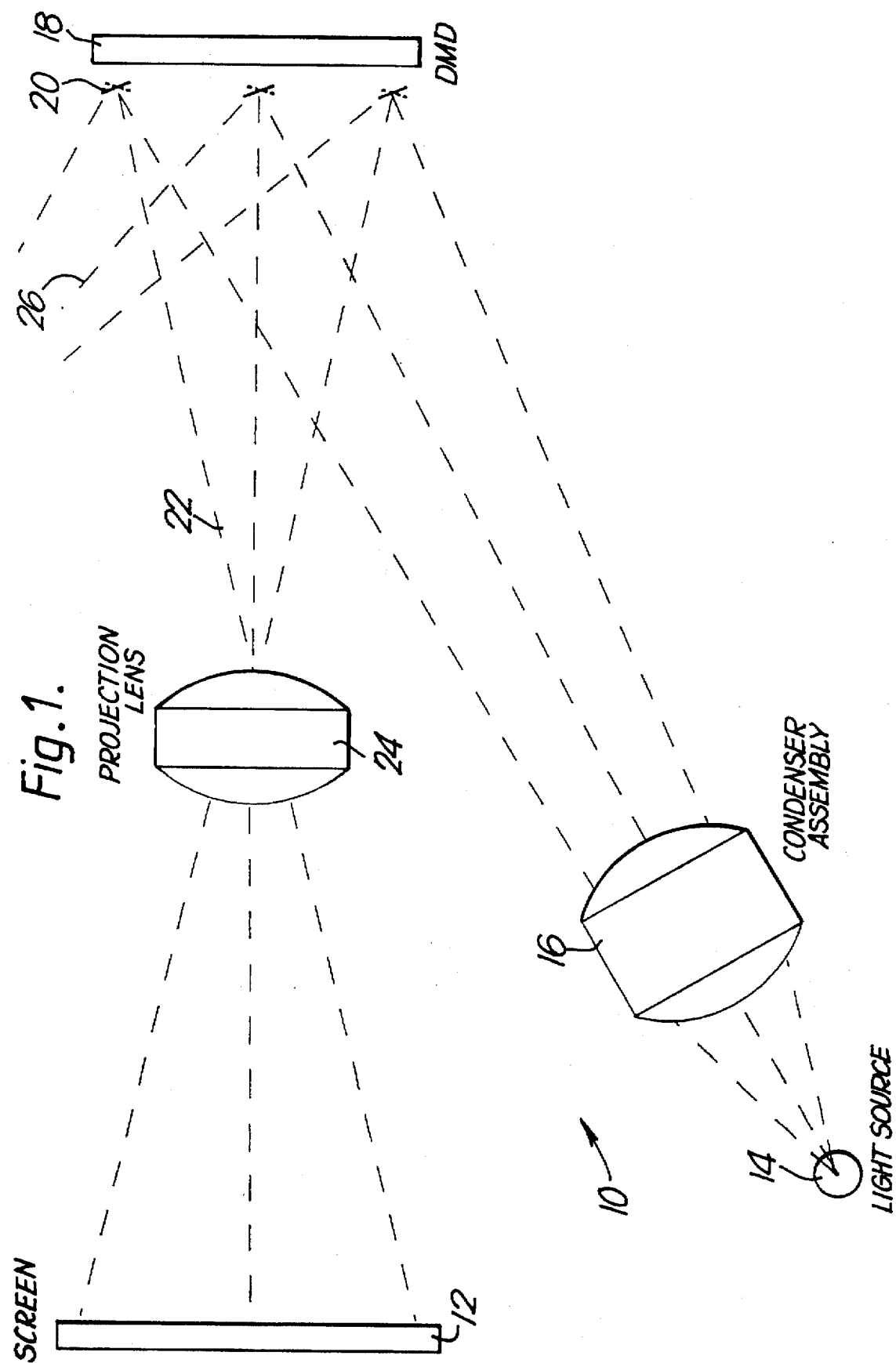
FIG. 1 is a simplified diagram of a DMD with its optical system for a projection system.

A projection display 10 is shown in FIG. 1 which comprises a screen 12 and a powerful light source 14. Light from the light source is collected by an optical condenser assembly 16 and falls on a DMD 18. Each individual mirror element 20 of the DMD has two stable positions, as noted on the figure. In one position, shown in full lines, light is reflected along the path 22 through an optical projection lens system 24 by which it is imaged onto the screen 12. In the other stable position of the mirror element 20, shown in broken lines, light is reflected away from the projection lens system and the screen, as shown at 26. It should be noted that FIG. 1 is not to scale; each mirror 20 is about 20 μm square and they are closely spaced.

At any instant during a display, certain mirror elements 20 will be in their ON position (full lines) and the other mirror elements will be in their OFF position (broken lines), so that the instantaneous picture seen on the display will comprise a black and white picture.

Figure 2:
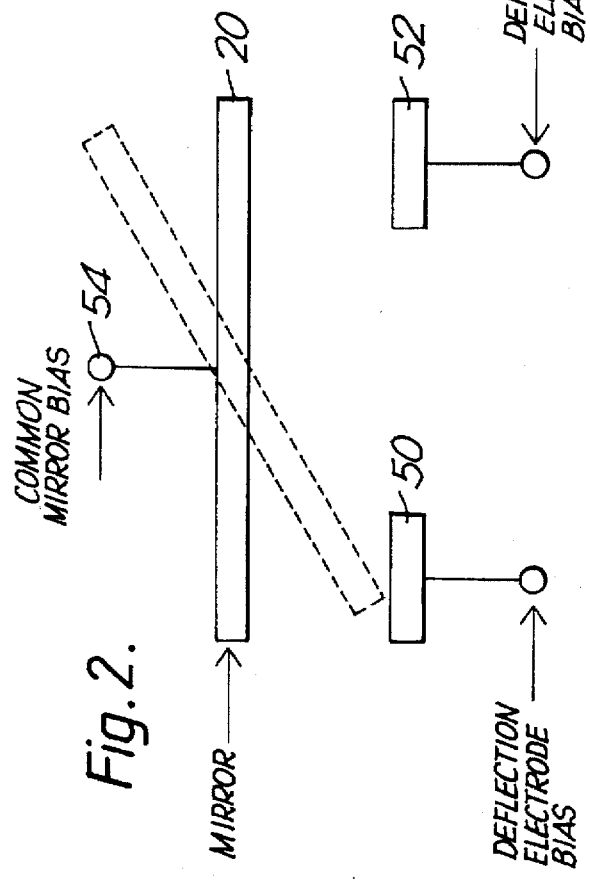
FIG. 2 illustrates how one mirror element is deflected.

FIG. 2 indicates in outline one of the mirrors 20 with its ON and OFF positions shown respectively here in broken and full lines. It is controlled by two deflection electrodes 50,52 which exert an electrostatic attraction on the mirror. In addition a common bias is applied at a terminal 54 to all the mirrors to hold them in their ON and OFF positions after the potential on the deflection electrodes has leaked away. The sequence of application of potentials has been described above.

Figure 3:
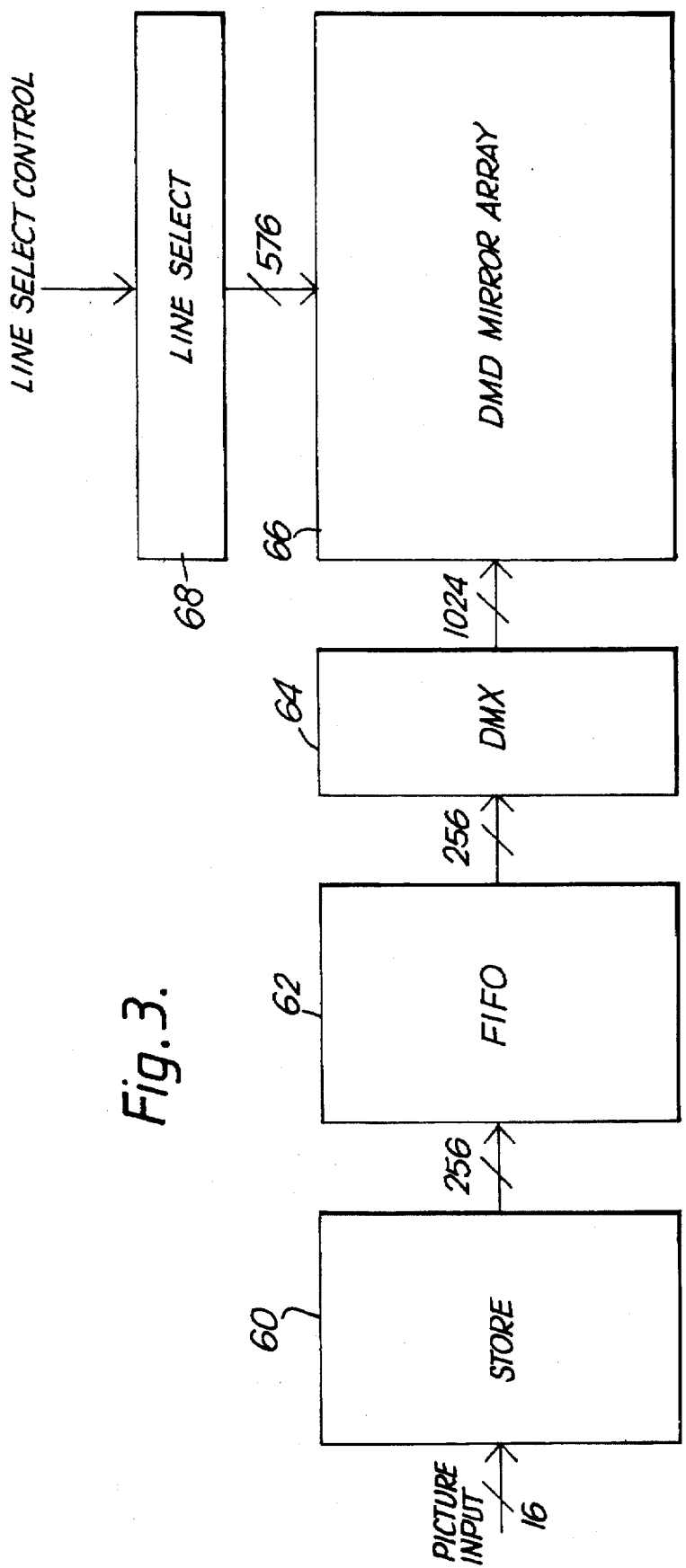
FIG. 3 is a block diagram of the array addressing system.

The manner in which data is transferred into the array is illustrated in FIG. 3. The video picture input is applied to a store 60 which re-arranges the data, as the DMD mirror array 66 requires that all the bits of the same significance are loaded at the same time over the whole image, unlike the received video signal which has all the bits of one pixel received together. The store output is applied to a FIFO memory 62 which acts as a buffer because the data is loaded into the array 66 at a variable rate. The FIFO's need to store over half a frame of picture data. A demultiplexer 64 is included to reduce the need for 1024 connectors between the FIFO memories 64 and the mirror array 66, as previously described. The mirror array 66 is controlled by line selection circuitry 68 responsive to a line select signal from a control circuit.

A method by which 10-bit grey scale resolution can be obtained whilst retaining a 78 microsecond minimum data transfer time will now be described.

10-bit grey scale resolution means 1024 brightness levels may be described as brightness levels 0 to 1023. Each of these brightness level is obtained by switching the mirrors to the state for a time proportional to the required brightness level. Therefore if the frame period of 20 milliseconds is divided into 1023 units of time, which is obtained by summing the binary sequence 1,2,4,8, to 512, brightness level 9 would be obtained by switching the mirrors on for 1 and 8 units of time, there being 10 possibilities available, 1, 2, 4, 8, 16, 32, 64, 128, 256, and 512 units of time.

One unit of time is 19.5 microseconds, and therefore if we assume the minimum "on" time for the mirrors is 78 microseconds, brightness level 4 is the minimum that can be obtained, 1, 2, and 3 not being possible. Therefore to obtain the 10 bit grey scale resolution, the process is divided into two stages, one to cover levels 1, 2, and 3 and the second stage to cover levels 4 to 1023.

The first stage involves measuring the average brightness of a number of adjacent pixels and if it is below the level 4, switching "on" the correct proportion of pixels in the measured group to level 4, to give the same average brightness. This process results in a loss of picture resolution in these dark areas but the human eye is less able to perceive picture resolution in the dark areas. This is described in more detail below.

The second stage involves the replacement of the "1" and "2" switch-on periods by "5", "6", and "7", so that there are now 11 possible switch on periods of 4, 5, 6, 7, 8, 16, 32, 64, 128, 256, and 512. units of time, which are all greater than 78 microseconds. The total number of units of time has now increased to 1038, which results in a decrease of the unit of time by 1.5%, but this can be considered as negligible. With this arrangement, brightness level 9 would be obtained by switching the mirrors on for 4 and 5 units of time, and therefore by using a suitable 10 to 11 bit encoder, every brightness level between 4 and 1023 can be obtained. With the arrangement just described, the longest period for which the mirrors will be in the "on" state is 512 units of time which is nearly half a frame period, and thus the FIFO's in FIG. 3 must be capable of storing up to half a frame of information. The size of these components may be critical since they must be very close to the mirror array and the storage requirement of these FIFO's could be reduced considerably if the "512" units of switch on time was split into two "256" units of switch on time, then the longest interval in which there is no output from the FIFO' should be ¼ of a frame period. We would then need a 10 to 12 bit encoder, the mirrors would flip 12 times per frame period and the data rate between store and FIFO's increases by 10%.

Figure 4:
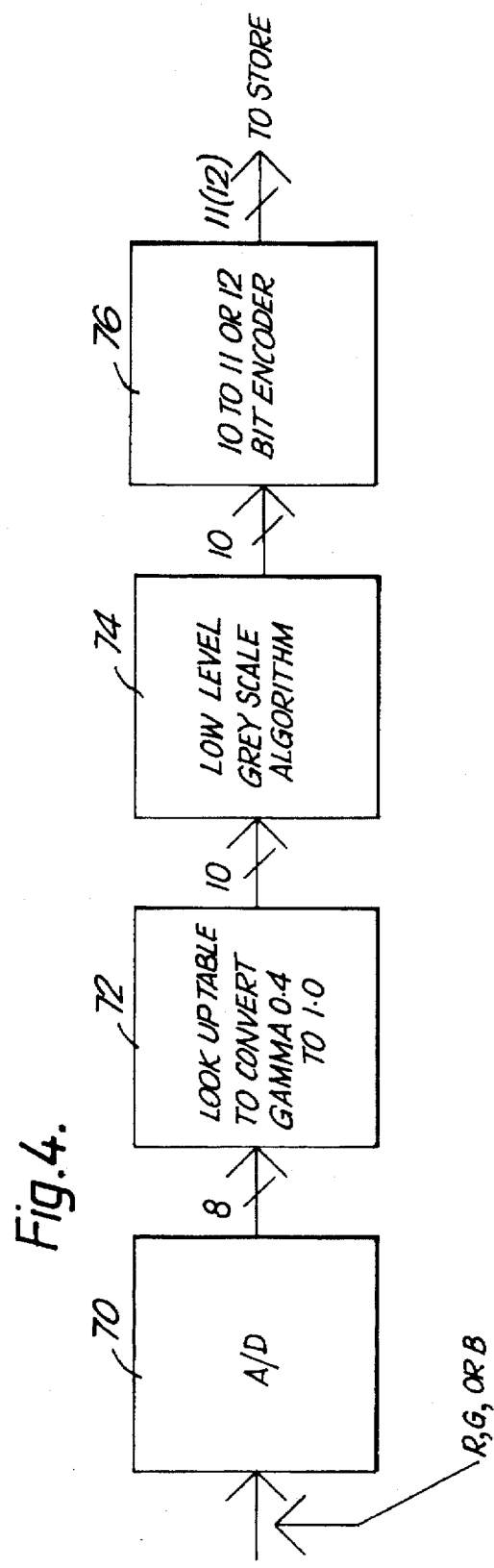
FIG. 4 illustrates the circuitry preceding the store of FIG. 3.

FIG. 4 shows the signal path from the input to the projector to the store in FIG. 3.

The input to the projector is normally three separate analogue signals of red, green and blue and any other type of coded video signal would be converted to R,G,B. There is then identical processing for the three channels and therefore only one needs to be described. An analogue to digital converter (A/D) 70 samples the incoming signal at a rate that coincides with the number of pixels in the mirror array, and since this incoming signal is gamma corrected, which is a universal standard to compensate for the CRT transfer characteristic, 8 bits resolution is satisfactory. The mirror array has a linear characteristic and therefore the 0.4 incoming gamma is converted to unity by a look-up table 72, the output having 10 bits resolution, a minimum requirement for a linear transfer characteristic.

This 10 bit signal is then processed by a low level grey scale algorithm 74, before being connected to a 10 to 11 or 10 to 12 bit encoder 76. The 11 or 12 bit output of this encoder is then coupled to the store 60 described in FIG. 3.

The above-mentioned first stage will now be described in more detail, in two variants. This provides display of levels 1, 2 and 3.

Low Level Intensity Algorithm

Figures 5, 6:
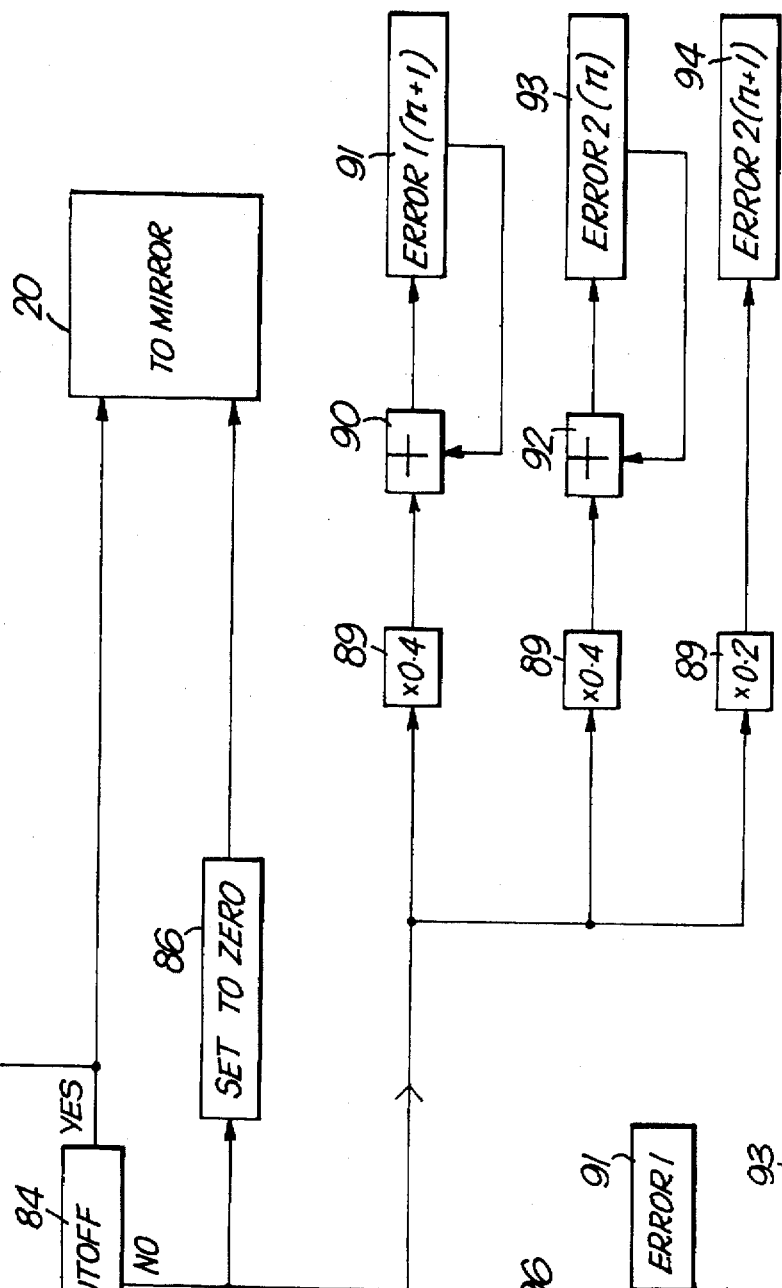
FIGS. 5 and 6 form a block diagram of a dithering algorithm used for display of levels 1, 2 and 3 in one example.

Referring to FIG. 5, each colour channel of red, green and blue is treated separately and identically. The algorithm is an adaptive error diffusion process. To the incoming signal 80 the error signal 81 is added 82. If the new value of the colour intensity is greater than or equal to the minimum as determined at 83, the signal is processed as normal and applied to the mirror 20, and the error signal set to zero at 85. If it is below the minimum, the signal is set to zero at 86 and the error term set to the value of the colour signal. This error is then "diffused" horizontally, vertically and diagonally. Therefore two line buffers 87,88 are required to hold the accumulating value of the error signal for the current line and the next line, as shown in FIG. 6, which shows a cross-over switch 95 controlled by line number 96. The proportion of error signal in each direction can be set by weighting factors fed to the multipliers 89. Note that this algorithm is not dependent on the minimum level. This is used as a parameter to the comparator, and can be changed easily without affecting the rest of the algorithm.

FIG. 5 shows one channel of the algorithm (all channels are identical). The signal is added with the error term stored in the current error line buffer, called error1(n), at the current pixel location. The corrected signal is fed to the comparator 84, which is also fed the value of the minimum level. If the signal is greater than or equal to this minimum, then it is fed to the display device directly. The error signal at the next pixel location in the second error line buffer, error2(n), is set to zero (error2(n+1)), 85. All other values remain unchanged. If the signal is less than the minimum allowed, then the error term is set to the signal value. The signal is set to zero 86 and fed to the display device. The error signal is then diffused according to the desired scheme.

A preferred version is as follows. The two adjacent pixels (one horizontally and one vertically) receive ⅖ of the value each, and the pixel situated diagonally below the current pixel in the scan direction receives ⅕ of the value. In the case of the horizontally adjacent pixel, the diffused error is added in adder 90 to the error term in buffer error1(n) 91 at the next pixel location (error1(n+1)). For the vertical pixel, the diffused error is added in adder 92 to the error term in buffer error2(n) 93 and the current pixel location. For the diagonal pixel, the value in buffer error2(n) 94 at the next pixel location is set to the diffused term (error2(n+1)).

At the end of each line the designation of the two error buffers is swapped around by changing switch 95 (i.e. error2 becomes error1 and vice-versa). At the start of each new frame the error buffers are cleared.

The system described can be implemented in discrete hardware but will more conveniently be implemented in software, in which case FIG. 5 should be regarded as a flow chart.

Low Level Luminance Algorithm

Thus, as described, it is possible to apply a dithering algorithm independently to each of the three colour channels. However, if the lowest available level is relatively high, then this approach can produce noticeable colour spikes in dark areas. To overcome this problem it is proposed that a dithering algorithm be applied in low luminance areas, with the chrominance being set to zero. As the eye has a reduced response to colour information in low light, this should not be too noticeable.

Figure 7:
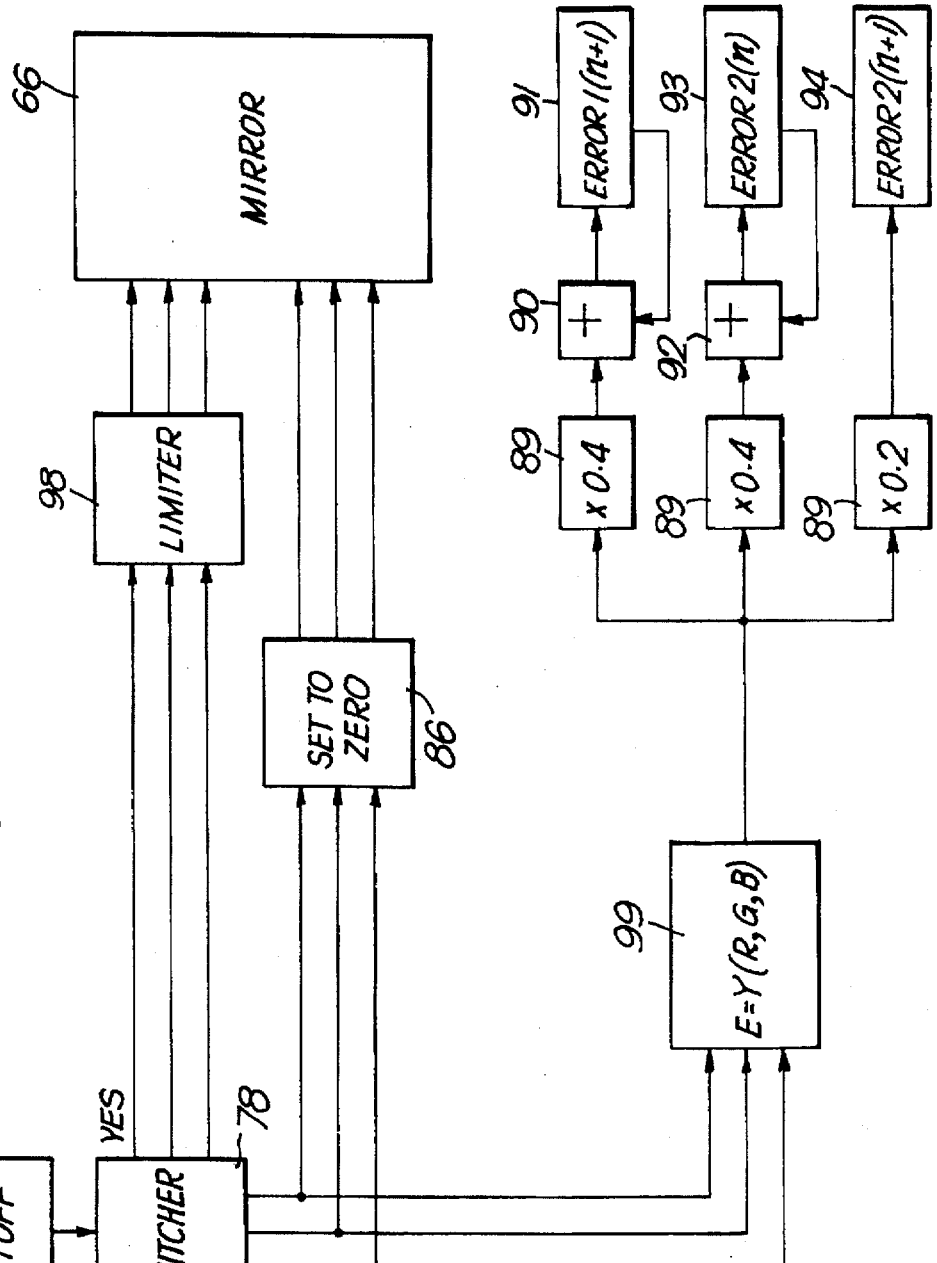
FIG. 7 is a block diagram of a dithering algorithm used for display of levels 1, 2 and 3 in another example.

Referring to FIG. 7, which is a similar diagram to FIG. 5, two line buffers, called error1(n) and error2(n), hold the accumulated error signal for the current and the next line. At the start of each frame the buffers are cleared. At the start of each line the value in the error buffer for the next line at the first location is set to zero. The error signal carried over from previous pixels is added in turn to each channel, RGB. There is no need to convert to a YUV representation. This can be seen by considering the relevant equations:
First calculate luminance:

$$Y=(R * 77.0+G * 150.0+B * 29.0)/256.0$$

Then add error:

$$Y=Y+err$$

Convert back:

$$R=Y+(V * 256)/187;$$

$$G=Y+(((U * -29)/148+(V * -77)/187) * 256)/150;$$

$$B=Y+(U * 256)/148;$$

The new colour values are the sum of the old chrominance and the new luminance values. Therefore the error signal is added directly to each value, and there is no need to perform the corrections. The new values are then summed together. If the total value is less than three times the minimum displayable value for one channel, then dithering is used.

The three colour values are combined in circuit 79 (using the equation for Y above) to create the total luminance error for that pixel. When the resultant is less than a threshold set in a cut-off circuit 97, it is fed by a switch 78 to the diffuser matrix, which adds a proportion of the error to the error signals for the next pixel in the line, the pixel in the next line at the current location, and the pixel at the next location in the next line. The three colour values are set to zero in circuit 86 and fed to the display device 66. If the summed value is greater than or equal to the cutoff value, the colour signals are fed to a limiter 98. This sets any values below the minimum displayable to zero. The colours are then fed to the display device. The error signal at the next pixel location on the next line is set to zero.

At the end of each line the two error buffers are swapped around, with error1 becoming error2 and vice-versa, as with the previous example, and illustrated in FIG. 6.

Second Embodiment

Figure 8:
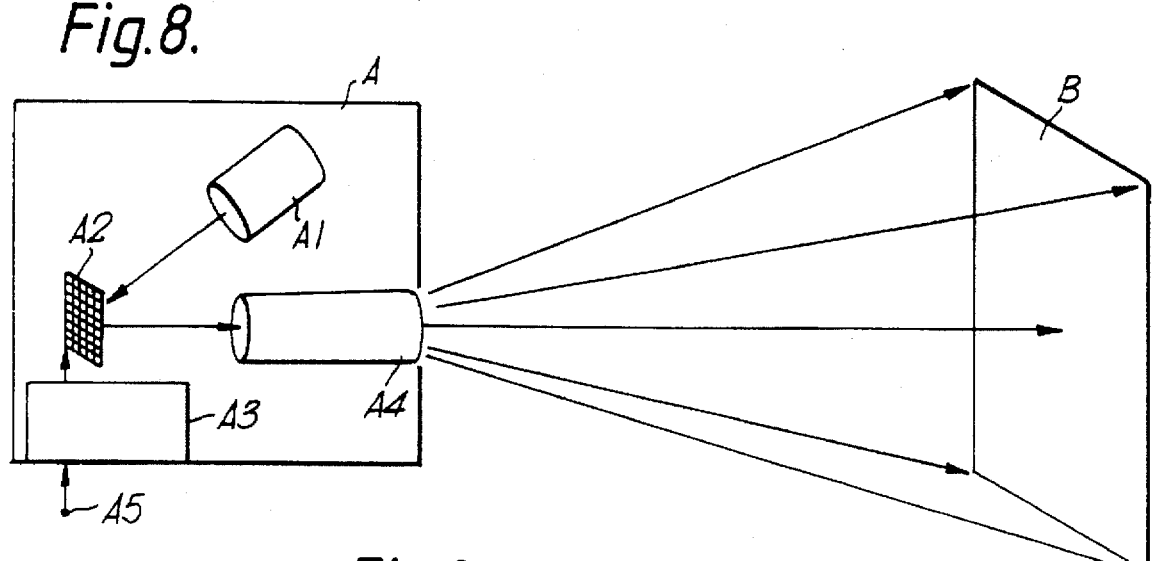
FIG. 8 shows schematically the general arrangement of another projection system embodying the invention and including a spatial light modulator of the DMD type.

Referring to FIG. 8, a projection system comprises a reflective screen (for example a cinema screen) B and a projector A, positioned and aligned relative to the screen so as to generate a focused image on the screen.

The projector A comprises a lamp A1, typically rated at several kilowatts for a cinema application, generating a light beam which is directed onto a reflective planar spatial light modulator A2 comprising, for example, a DMD array of 512×512 individual pixel mirrors. Each mirror of the display device A2 is individually connected to be addressed by an addressing circuit A3 which receives at an input A5 a video signal in any convenient format (for example, a serial raster scanned interlaced field format) and controls each individual mirror in accordance with the corresponding pixel signal value within the video signal.

Figure 9:
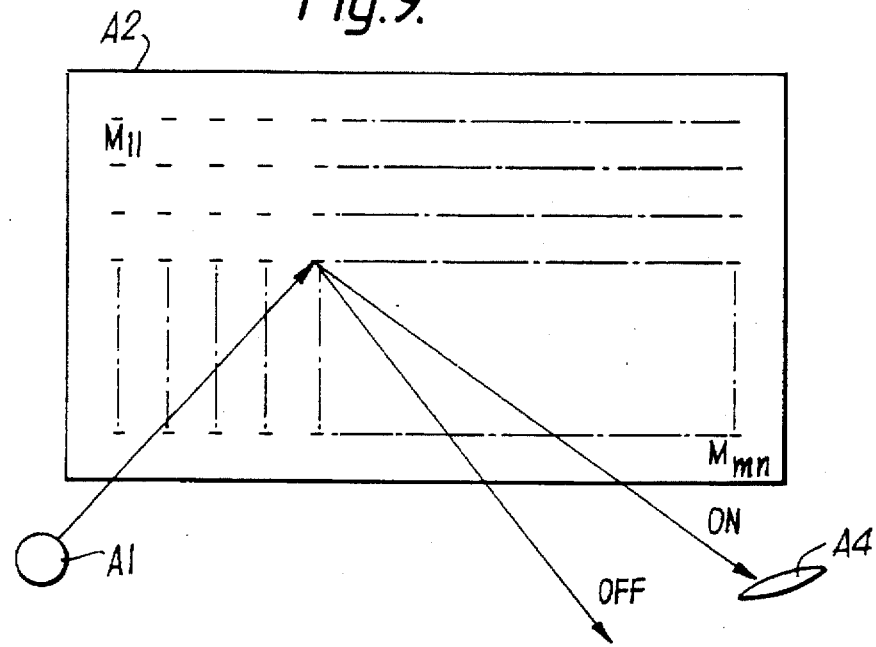
FIG. 9 is a view of the DMD device indicating the pixel mirror elements.

The modulated reflected beam from the active matrix device A2 (or rather, from those pixel mirrors of the device which have been selectively activated by the address circuit A3) is directed to a projector lens system A4 which, in a conventional manner, focuses, magnifies and directs the beam onto the screen B as shown schematically in FIG. 9.

Figure 10:
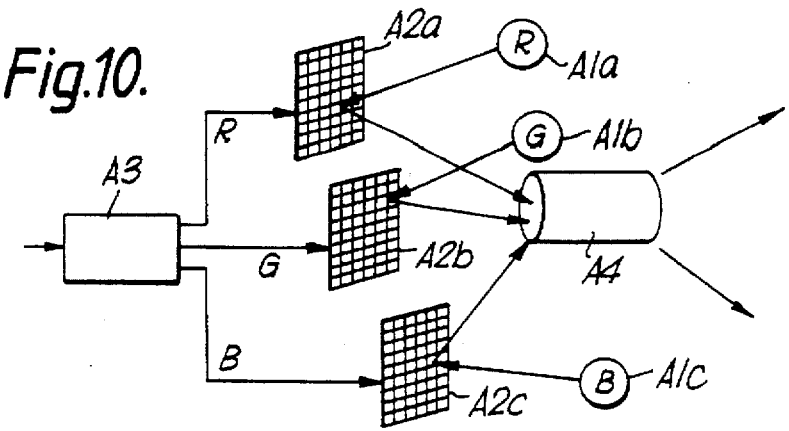
FIG. 10 shows schematically the arrangement of a colour projection system.

As shown in FIG. 10, in a three colour system, three separate active matrix devices A2a–A2c are provided, one driven by each of three separate colour video signals from the address circuit A3, with separate illumination arrangements A1a–A1c producing beams of the different colours. The arrangement may be as disclosed in U.S. Pat. No. 4,680,579, for example. The light reflected from the three devices A2a–A2c is combined (not shown) and supplied to the lens system A4.

Figure 11:
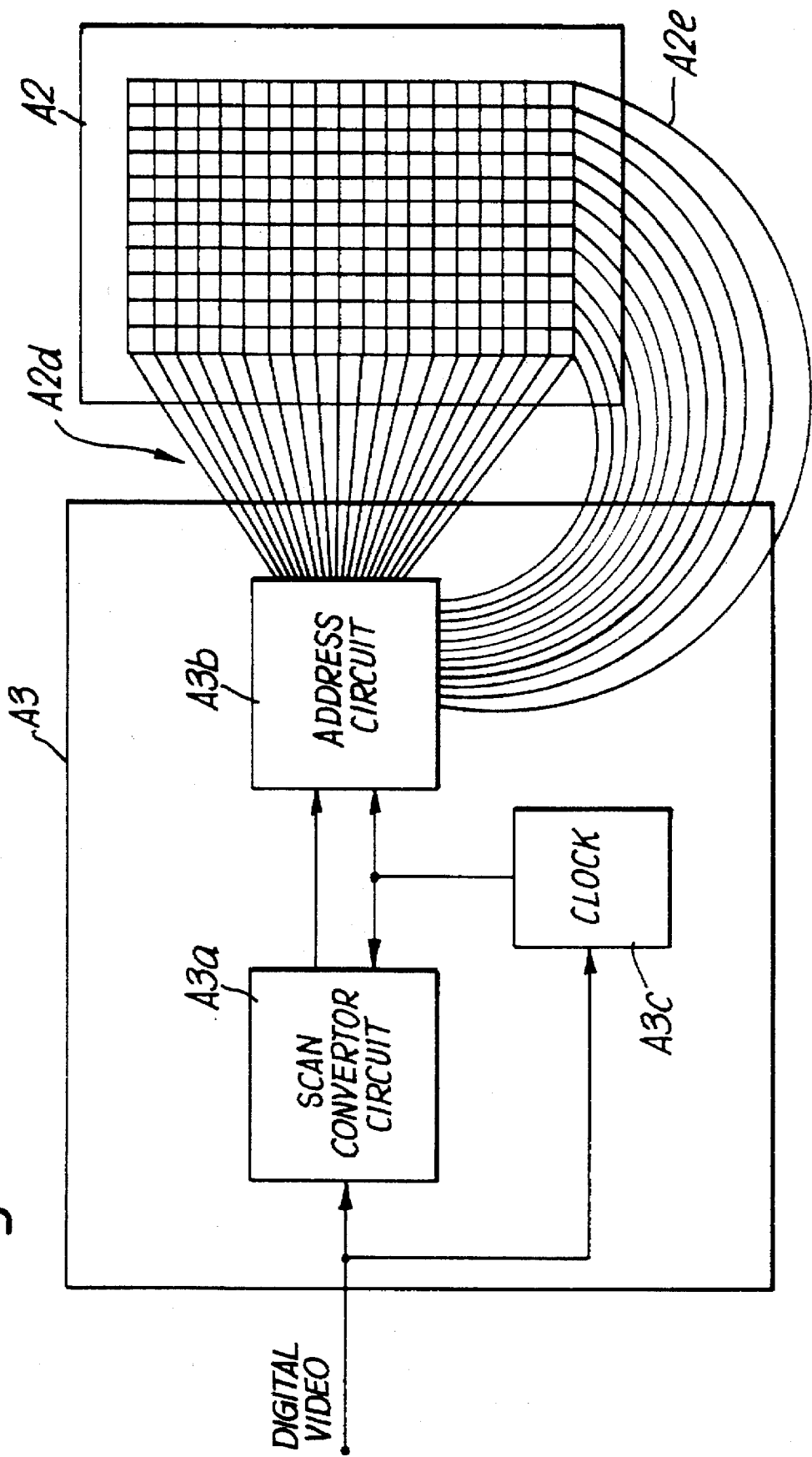
FIG. 11 shows schematically a portion of FIG. 8 in greater detail.

Referring to FIG. 11, one type of display device comprises a plurality of row enable lines A2d and a plurality of column enable lines A2e. The address circuit A3 comprises an input port receiving a digital video signal in an input format (for example, a conventional line scanned interlaced field format), a scan convertor circuit A3a for converting the input video signal format into one suitable for display on the device A2, and an addressing circuit A3b arranged to selectively activate corresponding pixel mirrors of the device A2 in accordance with a signal from the scan convertor circuit A3a. In a colour system of the type shown in FIG. 10, the scan convertor circuit receives a composite colour video signal, for example, and generates therefrom three separate colour component video signals supplied to three separate addressing circuits A3b, one for each display device A2. A clock circuit A3c controls the timing of the address circuit A3b; in one preferred mode of operation, as discussed above, the intensity displayed by each pixel mirror is controlled by controlling the time for which that pixel mirror is deflected, and corresponding timing signals are derived from the clock A3c.

Figure 12:
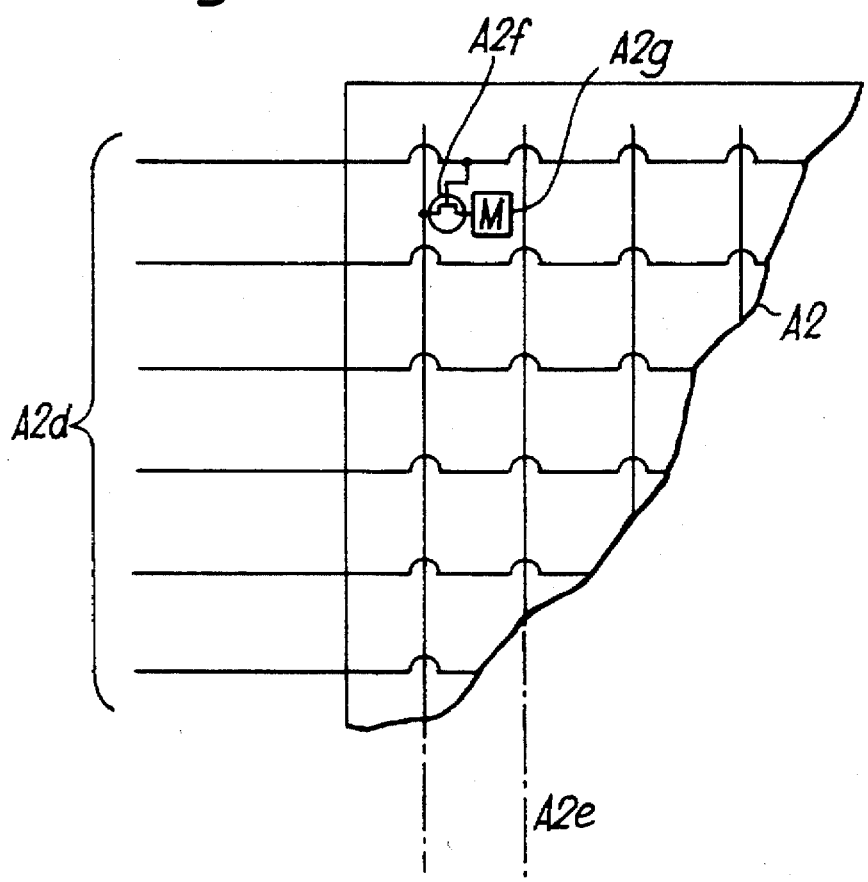
FIG. 12 shows a detail of the mirror array device of FIG. 9.

Referring to FIG. 12, associated with each crossing point where a particular row line and column line meet, there is provided a semiconductor switch A2f the control terminal of which is connected to, for example, a row enable line A2d. For example, as shown, the switch may comprise a field effect transistor, the gate of which is connected to a row enable line A2d. The source of the field effect transistor is connected to one of the column enable lines A2e and the drain to the deflection terminal of a deflectable mirror device. Thus, each mirror device A2g will, when addressed by a row enable signal, deflect in response to the signal applied to its corresponding column enable line A2e. Each mirror device A2g and switch A2f combination is arranged to latch the display state of the mirror device A2g until the next time the mirror device is addressed.

Figure 13:
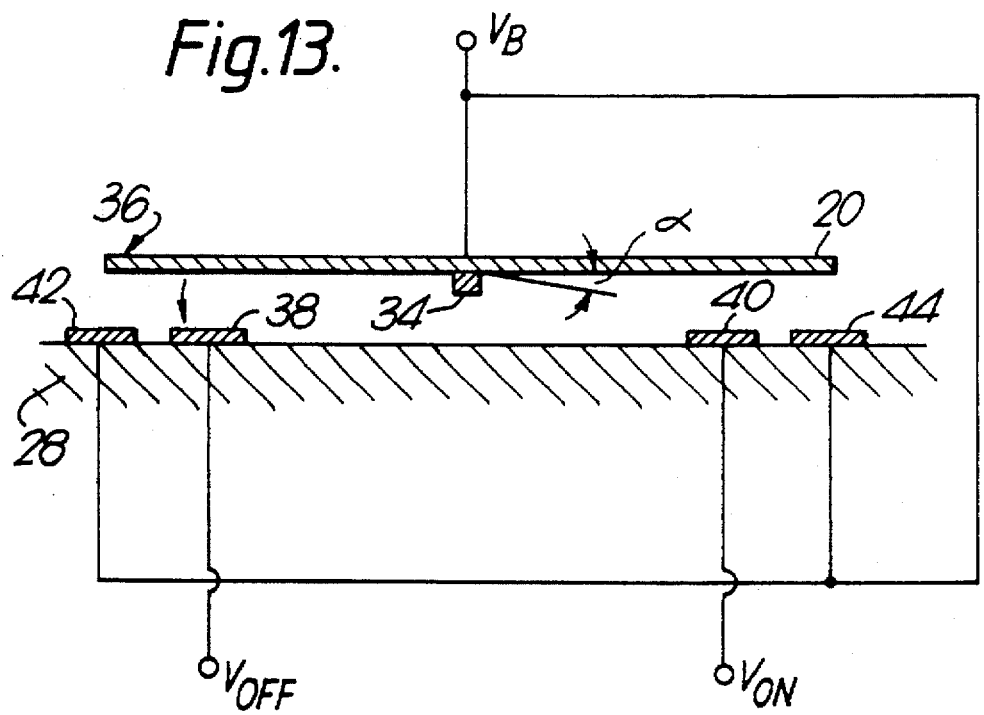
FIG. 13 is a schematic side view of a light modulator mirror element used in one embodiment of the invention.

An individual mirror element is shown in FIG. 13. The element comprises a torsion beam 20 in the form of a plate, supported by a torsion rod 34 which in turn is supported at its ends (not shown). A substrate 28 carries a pair of control terminals 38, 40 (address electrodes) symmetrically disposed around the axis of the torsion beam defined by the torsion bar 34. The control terminals 38, 40 are connected to addressing lines (not shown) and a voltage is supplied to one or other. Also provided on the substrate 28 are a pair of landing electrodes 42, 44 disposed under the edges of the torsion beam mirror element 20. On the outer surface of the torsion beam is a reflective coating 36. The landing electrodes 42, 44 are electrically connected to the torsion beam 20, which is conductive, and is connected to a bias voltage source $V_B$.

Each modulator has individual control terminal lines $V_{ON}$, $V_{OFF}$ connected to the control terminals 38, 40.

In use, generally speaking, the application of a voltage to one control terminal 40 will set up an electric field between the control terminal 40 and the torsion beam 20; the voltage supplied to the control terminal 40 is generally such that the field is attractive. The beam 20 therefore tends to rotate through an angle α towards the control terminal 40 depending upon the magnitude of the field, thus changing the orientation of the torsion beam. The torsion bar 34 tends to resist any such rotation. If the field is sufficiently strong the beam 20 will be drawn to make physical contact with the landing electrode 44; to avoid unwanted discharge the two are connected in common. The magnitude of the attractive field is controlled therefore by the bias voltage $V_B$ applied to the beam 20 and by the voltage applied to the control electrode 40. It would be possible to simultaneously apply a voltage to the other control electrode 38, but in practice this is avoided. Depending on the magnitude of the bias voltage, the torsion beam 20 may have two or three stable positions.

At any instant during a display, certain mirror elements 20 will be in their ON position and the other mirror elements will be in their OFF position, so that the instantaneous picture seen on the display will comprise a black and white picture. In practice, in use the mirrors are flipped back end forth between their ON and OFF positions. Shades of grey can be displayed by varying the mark-space ratio or effective proportion of the time for which a mirror is ON. The mark-space ratio may typically vary from black to white in steps of about 0.05% (some 2000 steps) to provide a high quality display.

For further description reference should be made to the documents cited in the introduction of this application.

Figure 14:
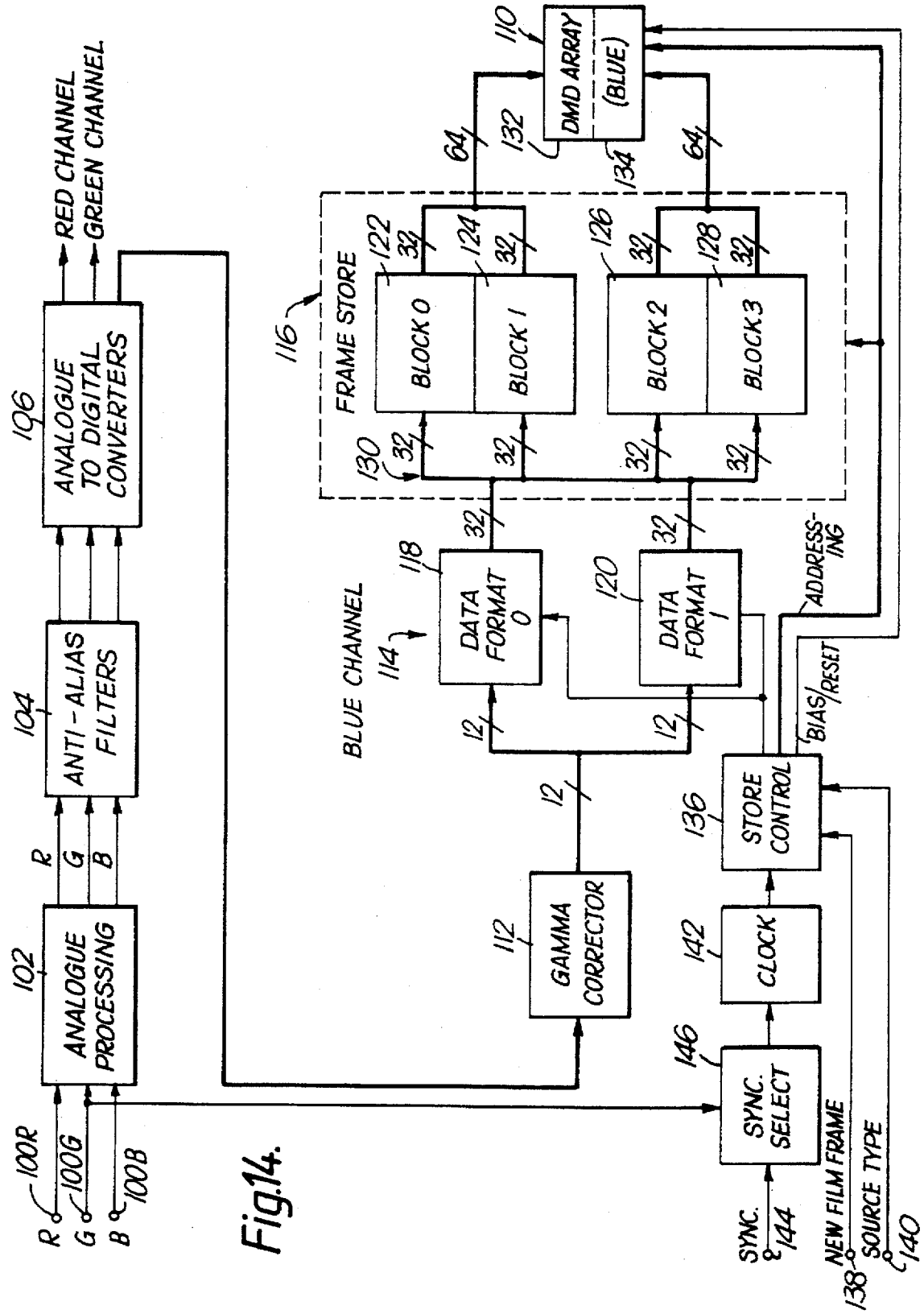
FIG. 14 is a schematic block diagram showing the driver circuitry for a DMD array.

The manner in which the DMD device is driven will now be described with reference to FIG. 14. The system receives red, green and blue signals at inputs 100R, 100G and 100B. Alternatively the signals maybe received in Y, U, V or Y, I, Q form. The input video signals are processed in analogue processing circuits 102 which control gain and lift, and provide for matrixing of the signals to control saturation, or when required to convert the signals to R, G, B form.

The signals are then passed to anti-alias filters 104. Such filters are well-known and serve to remove frequency components that could give rise to problems in the subsequent analogue-to-digital converters (ADCs) 106. When the signals are sampled, high signal frequencies above half the sample frequency can be reflected back by the sampling operation into the low frequency part of the signal. The filters 104 remove such components. The filters are switchable in dependence upon the signal format, e.g. 525 or 625 lines, and conventional or enhanced aperture ratio (4:3 or 16:9).

The R, G and B signals are then applied to separate red, green and blue channels, each of which has a DMD array 110. Only the blue channel is shown; the others are similar.

The digital blue colour component signal is first applied to a gamma corrector 112. The gamma corrector takes the form of a read-only memory configured as an 8-bit input to 11-bit or 12-bit output look-up table. The output of the gamma corrector is applied through a data formatting stage 114 to a frame store stage 116 and thence to the DMD 110.

The data formatting stage comprises two data format circuits 118 and 120. Each of these holds half a line of data, and they are arranged so that while data is being written into one, data is being translated out of the other into the frame store 116. The frame store stage is divided into four blocks 122, 124, 126, 128, each of which can accommodate half a frame of data. The frame store can thus hold two complete frames (or pictures) of data. This corresponds to four fields of an interlaced signal. Each of the two data format circuits has access by a bus 130 to each of the four blocks of the frame store. The outputs of the frame store blocks are then applied to the DMD 110. The DMD is divided into upper and lower halves 132 and 134 which are separately addressed, so as to reduce the required data rate. The upper half 132 receives the output of frame store blocks 122 and 124, and the lower half 134 receives the output of frame store blocks 126 and 128.

The system is controlled by a store controller 136 which supplies appropriate addresses to the frame store 116, and the DMD 110, provides bias and reset pulses to the DMD 110, and controls the data format stage 114. The store control receives a signal from an input 138 indicating the start of a new film frame, a signal at an input 140 indicating whether the picture was originally derived from an image by a camera or by a telecine, and clock signals from a clock circuit 142. The clock circuit is driven from synchronising pulses in the video input, e.g. the green signal, or by external sync. pulses received at an input 144, as selected by a sync. select circuit 146. The inputs 138, 140 may in fact be merged into a single input, as will be apparent from the following.

With a colour display system, as illustrated, it may be necessary to allow for adjustment of the signals sent to the DMD arrays 110 so that the three colour images for the red, green and blue components are properly in registration. Normally no shift is applied to the green channel, but the red and blue channels are adjusted to match the green channel. The adjustment required would typically be in the range of plus or minus 5 pixels both horizontally and vertically. Some shifts will cause the picture to move off the array, which means that the equivalent pixels on the other arrays must be blanked so as to avoid colour fringes.

The frame store 116 is constituted by standard VRAM (video random access memory) and the transfer to the DMD array 110 is through the VRAM serial port. It is necessary for the data to be transferred from the serial port of the VRAM store to the DMD at the highest possible speed, so as to minimise "dead" periods between the transfer of different bit frames. It will be recalled that the DMD array receives and displays simultaneously a given bit value for all the pixels of the array, and then goes on to the next bit value, and so on.

For bits of higher significance the data for the next bit frame is transferred to the array towards the end of the previous display period. For lower significant bit frames there is not enough time to transfer the data during the previous display period. To overcome this problem, the whole display is blanked, which can be done very quickly, to provide sufficient time to transfer the data for the next bit frame.

In the system of FIG. 7 with 11 bit values being output from the gamma corrector 112, normally there would be 2048 possible levels, and 2048 divisions of each complete frame period. However, in order to allow for sufficient loading time, the complete frame period is divided into 2218 divisions, and each of the smaller time periods, that is 16/2218 and smaller, are supplemented by 26 dead divisions, or clock periods. Furthermore, the periods 3/2218, 2/2218 and 1/2218 are too small to be achievable and are not necessary in practice, The very low light levels to which they relate can be omitted without loss. However, at higher light levels it is essential to maintain a high level of definition to an accuracy of 1/2218. Thus all the steps from 4 to 2047 must be displayable even though levels 3, 2 and 1 can be omitted. To achieve this the following levels are used:

| | | | | |
|---|---|---|---|---|
| '1/2' | 1024/2218 | | | |
| '1/4' | 512/2218 | | | |
| '1/8' | 256/2218 | | | |
| '1/16' | 128/2218 | | | |
| '1/32' | 64/2218 | | | |
| '1/64' | 32/2218 | | | |
| '1/128' | 16/2218 | + | 26/2218 | = 42/2218 |

-continued

| | | | | | |
|---|---|---|---|---|---|
| '1/256' | 8/2218 | + | 26/2218 | = | 34/2218 |
| '1/512' | 4/2218 | + | 26/2218 | = | 30/2218 |
| '7/2048' | 7/2218 | + | 26/2218 | = | 33/2218 |
| '3/1024' | 6/2218 | + | 26/2218 | = | 32/2218 |
| '5/2048' | 5/2218 | + | 26/2218 | = | 31/2218 |

By using the values $7/2218$, $6/2218$ and $5/2218$, instead of $3/2218$ and $1/2218$, all values above $4/2218$ can be achieved with complete accuracy. There are now 9 binary periods and 3 non-binary periods. The necessary conversion can be achieved in the gamma corrector 112, which has a 12-bit output as shown, rather than an 11-bit output. The way in which the levels can be achieved is set out in the Table appended to this description. The missing parts of the table can readily be derived from the information given in the Table.

The frame store can be DRAM (dynamic RAM), namely VRAM as described above or standard DRAM, or can be SRAM (static RAM). DRAM requires refreshing if the store content is to be maintained for any length of time. For the longer bit frame periods, those where "dead" periods are not required, the new bit frame data is transferred to the DMD array 110 just before the end of the current display period. This is important for the DRAM version of the DMD frame store, because of the need to avoid any form of refresh of the dynamic cells.

For the shorter bit frame periods, where "dead" periods must be inserted, the method of operation is as follows:

a) Transfer complete bit frame to array (either during immediately previous display period, or "dead" period).

b) Transfer data to mirrors.

c) Write blanking signal to array d) Transfer blanking signal to mirrors (this then becomes the start of the "dead" period).

e) Transfer new bit frame of data to the array during the "dead" period.

The order of the display bits is not limited to any particular sequence, but it may prove useful to spread the shorter periods around so that the "dead" periods of 26 clock pulses are also spread around.

Each frame period of 20 ms (16.68 ms for 525 line displays) is divided into 2218 segments for display, of which 6×26 (=156) segments are always blanked due to the dead periods needed for new data to be written to the array. The maximum efficiency due to this alone is $$(2218-156)/2218 \times 100\% = 92.97\%.$$

It is very important that the dead periods are not exceeded so data must be available for transfer immediately the display is blanked and the transfer must proceed continuously. Other store operations, such as write, must continue, but be timed so as not to affect the serial transfer.

Data is clocked through the system at several different clock rates, dependent on line standard and aspect ratio, and the store control system 136 needs to take care of this fact. The input to the data format devices 114 is at input data rate, and these must be controlled by the control system. The output of the data formatters does not have to be synchronous with the input, although it may be convenient. The only limitation is that they are emptied in time for the next incoming line. The transfer of data into and out of the frame store 116 could always be at the same frequency, if fast enough VRAMs are used, independent of input data frequency, but phase locked to input field rate (50 or 59.94 Hz). The actual clock frequency used is not critical as long as it is high enough (e.g. 7.5 MHz or greater) to allow all of the data to be transferred from the data formatters. The data transfer from the frame store to DMD array could then be 20 MHz (nominal) which divides down (by 400,000 or 333,667 respectively) for phase lock to input field rate.

It will be seen from the foregoing that the DMD elements are selectively turned on for a series of durations varying in proportion to a basic period $1/2218$ multiplied by powers of two, i.e. $4/2218$, $8/2218$, $16/2218$ and so on up to $1024/2218$. The shortest duration for which a mirror can be turned on is a multiple of the basic period, i.e. $4/2218$, and is not the basic period $1/2218$ itself. The series therefore includes additional durations $5/2218$, $6/2218$ and $7/2218$ between the lowest displayed period of the basic period, i.e. $4/2218$, and the next power of two, i.e. $8/2218$. These additional durations comprise other (i.e. non-binary) multiples of the basic period. While the description has been related to a DMD device, the invention is applicable to other types of spatial light modulator in an analogous manner.

As described, the durations $1/2218$, $2/2218$ and $3/2218$ are ignored. In an alternative arrangement, they could be accommodated in the manner described with reference to the first embodiment. In this, durations of less than the minimum on time, i.e. $4/2218$, as displayed by turning on a proportion of the mirrors so that the mean number of mirrors turned on correspond to the desired duration. The additional amounts can be carried forward to one or more adjacent elements. In a colour system, the additional amounts can be carried forward as luminance values.

Also as with the first embodiment, the second embodiment can be arranged so that the longest duration is used twice. That is, the period 1024 can be broken down into two period of length 512.

Further features that may be used in conjunction with the present embodiment are described in International Patent Applications Nos. PCT/GB91/02033, PCT/GB91/02034 and PCT/GB91/02035 (Agents refs: 31974, 31975, 31978) the disclosure of which is hereby incorporated by reference.

TABLE

| | 1024 | 512 | 256 | 128 | 64 | 32 | 16 | 8 | 4 | 7 | 6 | 5 |
|---|---|---|---|---|---|---|---|---|---|---|---|---|
| 0 | 0 | 0 | 0 | 0 | 0 | 0 | 0 | 0 | 0 | 0 | 0 | 0 |
| 1 | 0 | 0 | 0 | 0 | 0 | 0 | 0 | 0 | 0 | 0 | 0 | 0 |
| 2 | 0 | 0 | 0 | 0 | 0 | 0 | 0 | 0 | 0 | 0 | 0 | 0 |
| 3 | 0 | 0 | 0 | 0 | 0 | 0 | 0 | 0 | 0 | 0 | 0 | 0 |
| 4 | 0 | 0 | 0 | 0 | 0 | 0 | 0 | 0 | 1 | 0 | 0 | 0 |
| 5 | 0 | 0 | 0 | 0 | 0 | 0 | 0 | 0 | 0 | 0 | 0 | 1 |
| 6 | 0 | 0 | 0 | 0 | 0 | 0 | 0 | 0 | 0 | 0 | 1 | 0 |
| 7 | 0 | 0 | 0 | 0 | 0 | 0 | 0 | 0 | 0 | 1 | 0 | 0 |
| 8 | 0 | 0 | 0 | 0 | 0 | 0 | 0 | 1 | 0 | 0 | 0 | 0 |
| 9 | 0 | 0 | 0 | 0 | 0 | 0 | 0 | 1 | 0 | 0 | 0 | 1 |
| 10 | 0 | 0 | 0 | 0 | 0 | 0 | 0 | 1 | 0 | 1 | 0 |
| 11 | 0 | 0 | 0 | 0 | 0 | 0 | 0 | 1 | 1 | 0 | 0 | 0 |
| 12 | 0 | 0 | 0 | 0 | 0 | 0 | 1 | 1 | 0 | 0 | 0 | 0 |
| 13 | 0 | 0 | 0 | 0 | 0 | 0 | 1 | 0 | 0 | 0 | 0 | 1 |
| 14 | 0 | 0 | 0 | 0 | 0 | 0 | 1 | 0 | 0 | 1 | 0 |
| 15 | 0 | 0 | 0 | 0 | 0 | 0 | 1 | 0 | 1 | 1 | 0 | 0 |
| 16 | 0 | 0 | 0 | 0 | 0 | 1 | 0 | 0 | 0 | 0 | 0 | 0 |
| 17 | 0 | 0 | 0 | 0 | 0 | 0 | 1 | 1 | 0 | 0 | 1 |
| 18 | 0 | 0 | 0 | 0 | 0 | 0 | 1 | 1 | 0 | 1 | 0 |
| 19 | 0 | 0 | 0 | 0 | 0 | 0 | 1 | 1 | 1 | 0 | 0 |
| 20 | 0 | 0 | 0 | 0 | 0 | 1 | 0 | 1 | 0 | 0 | 0 | 0 |
| 21 | 0 | 0 | 0 | 0 | 0 | 1 | 0 | 1 | 0 | 0 | 0 | 1 |
| 22 | 0 | 0 | 0 | 0 | 0 | 1 | 0 | 0 | 0 | 0 | 1 | 0 |
| 23 | 0 | 0 | 0 | 0 | 0 | 1 | 0 | 0 | 1 | 0 | 0 |
| 24 | 0 | 0 | 0 | 0 | 0 | 1 | 1 | 0 | 0 | 0 | 0 |

TABLE-continued

| | 1024 | 512 | 256 | 128 | 64 | 32 | 16 | 8 | 4 | 7 | 6 | 5 |
|---|---|---|---|---|---|---|---|---|---|---|---|---|
| 25 | 0 | 0 | 0 | 0 | 0 | 0 | 1 | 0 | 1 | 0 | 0 | 1 |
| 26 | 0 | 0 | 0 | 0 | 0 | 0 | 1 | 0 | 1 | 0 | 1 | 0 |
| 27 | 0 | 0 | 0 | 0 | 0 | 0 | 1 | 0 | 1 | 1 | 0 | 0 |
| 28 | 0 | 0 | 0 | 0 | 0 | 0 | 1 | 1 | 1 | 0 | 0 | 0 |
| 29 | 0 | 0 | 0 | 0 | 0 | 0 | 1 | 1 | 0 | 0 | 0 | 1 |
| 30 | 0 | 0 | 0 | 0 | 0 | 0 | 1 | 1 | 0 | 0 | 1 | 0 |
| 31 | 0 | 0 | 0 | 0 | 0 | 0 | 1 | 1 | 0 | 1 | 0 | 0 |
| 32 | 0 | 0 | 0 | 0 | 0 | 1 | 0 | 0 | 0 | 0 | 0 | 0 |
| 33 | 0 | 0 | 0 | 0 | 0 | 0 | 1 | 1 | 1 | 0 | 0 | 1 |
| 34 | 0 | 0 | 0 | 0 | 0 | 0 | 1 | 1 | 1 | 0 | 1 | 0 |
| 35 | 0 | 0 | 0 | 0 | 0 | 0 | 1 | 1 | 1 | 1 | 0 | 0 |
| 36 | 0 | 0 | 0 | 0 | 0 | 1 | 0 | 0 | 1 | 0 | 0 | 0 |
| 37 | 0 | 0 | 0 | 0 | 0 | 1 | 0 | 0 | 0 | 0 | 0 | 1 |
| 38 | 0 | 0 | 0 | 0 | 0 | 1 | 0 | 0 | 0 | 0 | 1 | 0 |
| 39 | 0 | 0 | 0 | 0 | 0 | 1 | 0 | 0 | 0 | 1 | 0 | 0 |
| 40 | 0 | 0 | 0 | 0 | 0 | 1 | 0 | 1 | 0 | 0 | 0 | 0 |
| 41 | 0 | 0 | 0 | 0 | 0 | 1 | 0 | 0 | 1 | 0 | 0 | 1 |
| 42 | 0 | 0 | 0 | 0 | 0 | 1 | 0 | 0 | 1 | 0 | 1 | 0 |
| 43 | 0 | 0 | 0 | 0 | 0 | 1 | 0 | 0 | 1 | 1 | 0 | 0 |
| 44 | 0 | 0 | 0 | 0 | 0 | 1 | 0 | 1 | 1 | 0 | 0 | 0 |
| 45 | 0 | 0 | 0 | 0 | 0 | 1 | 0 | 1 | 0 | 0 | 0 | 1 |
| 46 | 0 | 0 | 0 | 0 | 0 | 1 | 0 | 1 | 0 | 0 | 1 | 0 |
| 47 | 0 | 0 | 0 | 0 | 0 | 1 | 0 | 1 | 0 | 1 | 0 | 0 |
| 48 | 0 | 0 | 0 | 0 | 1 | 1 | 0 | 0 | 0 | 0 | 0 | 0 |
| 49 | 0 | 0 | 0 | 0 | 0 | 1 | 0 | 1 | 1 | 0 | 0 | 1 |
| 50 | 0 | 0 | 0 | 0 | 0 | 1 | 0 | 1 | 1 | 0 | 1 | 0 |
| 51 | 0 | 0 | 0 | 0 | 0 | 1 | 0 | 1 | 1 | 1 | 0 | 0 |
| 52 | 0 | 0 | 0 | 0 | 0 | 1 | 1 | 0 | 1 | 0 | 0 | 0 |
| 53 | 0 | 0 | 0 | 0 | 0 | 1 | 1 | 0 | 0 | 0 | 0 | 1 |
| 54 | 0 | 0 | 0 | 0 | 0 | 1 | 1 | 0 | 0 | 0 | 1 | 0 |
| 55 | 0 | 0 | 0 | 0 | 0 | 1 | 1 | 0 | 0 | 1 | 0 | 0 |
| 56 | 0 | 0 | 0 | 0 | 0 | 1 | 1 | 1 | 0 | 0 | 0 | 0 |
| 57 | 0 | 0 | 0 | 0 | 0 | 1 | 1 | 0 | 1 | 0 | 0 | 1 |
| 58 | 0 | 0 | 0 | 0 | 0 | 1 | 1 | 0 | 1 | 0 | 1 | 0 |
| 59 | 0 | 0 | 0 | 0 | 0 | 1 | 1 | 0 | 1 | 1 | 0 | 0 |
| 60 | 0 | 0 | 0 | 0 | 0 | 1 | 1 | 1 | 1 | 0 | 0 | 0 |
| 61 | 0 | 0 | 0 | 0 | 0 | 1 | 1 | 1 | 0 | 0 | 0 | 1 |
| 62 | 0 | 0 | 0 | 0 | 0 | 1 | 1 | 1 | 0 | 0 | 1 | 0 |
| 63 | 0 | 0 | 0 | 0 | 0 | 1 | 1 | 1 | 0 | 1 | 0 | 0 |
| 64 | 0 | 0 | 0 | 0 | 1 | 0 | 0 | 0 | 0 | 0 | 0 | 0 |
| 65 | 0 | 0 | 0 | 0 | 0 | 1 | 1 | 1 | 1 | 0 | 0 | 1 |
| 66 | 0 | 0 | 0 | 0 | 0 | 1 | 1 | 1 | 1 | 0 | 1 | 0 |
| 67 | 0 | 0 | 0 | 0 | 0 | 1 | 1 | 1 | 1 | 1 | 0 | 0 |
| 68 | 0 | 0 | 0 | 0 | 1 | 0 | 0 | 0 | 1 | 0 | 0 | 0 |
| 69 | 0 | 0 | 0 | 0 | 1 | 0 | 0 | 0 | 0 | 0 | 0 | 1 |
| 70 | 0 | 0 | 0 | 0 | 1 | 0 | 0 | 0 | 0 | 0 | 1 | 0 |
| 71 | 0 | 0 | 0 | 0 | 1 | 0 | 0 | 0 | 0 | 1 | 0 | 0 |
| 72 | 0 | 0 | 0 | 0 | 1 | 0 | 0 | 1 | 0 | 0 | 0 | 0 |
| 73 | 0 | 0 | 0 | 0 | 1 | 0 | 0 | 0 | 1 | 0 | 0 | 1 |
| 74 | 0 | 0 | 0 | 0 | 1 | 0 | 0 | 0 | 1 | 0 | 1 | 0 |
| 75 | 0 | 0 | 0 | 0 | 1 | 0 | 0 | 0 | 1 | 1 | 0 | 0 |
| 127 | 0 | 0 | 0 | 0 | 1 | 1 | 1 | 1 | 0 | 1 | 0 | 0 |
| 128 | 0 | 0 | 0 | 1 | 0 | 0 | 0 | 0 | 0 | 0 | 0 | 0 |
| 129 | 0 | 0 | 0 | 0 | 1 | 1 | 1 | 1 | 1 | 0 | 0 | 1 |
| 130 | 0 | 0 | 0 | 0 | 1 | 1 | 1 | 1 | 1 | 0 | 1 | 0 |
| 131 | 0 | 0 | 0 | 0 | 1 | 1 | 1 | 1 | 1 | 1 | 0 | 0 |
| 132 | 0 | 0 | 0 | 1 | 0 | 0 | 0 | 0 | 1 | 0 | 0 | 0 |
| 255 | 0 | 0 | 0 | 1 | 1 | 1 | 1 | 1 | 0 | 1 | 0 | 0 |
| 256 | 0 | 0 | 1 | 0 | 0 | 0 | 0 | 0 | 0 | 0 | 0 | 0 |
| 257 | 0 | 0 | 0 | 1 | 1 | 1 | 1 | 1 | 1 | 0 | 0 | 1 |
| 258 | 0 | 0 | 0 | 1 | 1 | 1 | 1 | 1 | 1 | 0 | 1 | 0 |
| 259 | 0 | 0 | 0 | 1 | 1 | 1 | 1 | 1 | 1 | 1 | 0 | 0 |
| 260 | 0 | 0 | 1 | 0 | 0 | 0 | 0 | 0 | 1 | 0 | 0 | 0 |
| 511 | 0 | 0 | 1 | 1 | 1 | 1 | 1 | 1 | 0 | 1 | 0 | 0 |
| 512 | 0 | 1 | 0 | 0 | 0 | 0 | 0 | 0 | 0 | 0 | 0 | 0 |
| 513 | 0 | 0 | 1 | 1 | 1 | 1 | 1 | 1 | 1 | 0 | 0 | 1 |
| 514 | 0 | 0 | 1 | 1 | 1 | 1 | 1 | 1 | 1 | 0 | 1 | 0 |
| 515 | 0 | 0 | 1 | 1 | 1 | 1 | 1 | 1 | 1 | 1 | 0 | 0 |
| 516 | 0 | 1 | 0 | 0 | 0 | 0 | 0 | 1 | 0 | 0 | 0 | 0 |
| 1023 | 0 | 1 | 1 | 1 | 1 | 1 | 1 | 1 | 0 | 1 | 0 | 0 |
| 1024 | 1 | 0 | 0 | 0 | 0 | 0 | 0 | 0 | 0 | 0 | 0 | 0 |
| 1025 | 0 | 1 | 1 | 1 | 1 | 1 | 1 | 1 | 1 | 0 | 0 | 1 |
| 1026 | 0 | 1 | 1 | 1 | 1 | 1 | 1 | 1 | 1 | 0 | 1 | 0 |
| 1027 | 0 | 1 | 1 | 1 | 1 | 1 | 1 | 1 | 1 | 1 | 0 | 0 |
| 1028 | 1 | 0 | 0 | 0 | 0 | 0 | 0 | 1 | 0 | 0 | 0 | 0 |
| 2047 | 1 | 1 | 1 | 1 | 1 | 1 | 1 | 1 | 0 | 1 | 0 | 0 |

We claim:

1. A spatial light modulator comprising:

a light-modulating array of deformable mirrors;

the individual mirrors of which are deflectable between on and off orientations, and control means for applying control signals to the array to control the orientation of said mirrors;

said means for applying control signals being arranged to selectively turn chosen mirrors on for a series of durations so as to display different light levels, said series including a shortest duration which is substantially equal to a non-zero positive integer power of two multiple of a basic period, binary durations substantially equal to said basic period multiplied by different non-zero positive integer powers of two, and additional durations between said shortest duration and the next highest binary duration substantially equal to non-zero positive integer non-binary multiples of said basic period.

2. A modulator according to claim 1, in which said shortest duration is a multiple of 4 of said basic period, and said additional durations comprise multiples of 5, 6 and 7 of said basic period.

3. A modulator according to claim 1, in which said shortest duration is a multiple of 2 of said basic period, and said additional durations comprise a multiple of 3 of said basic period.

* * * * *